US011230240B2

(12) United States Patent
Eklund

(10) Patent No.: US 11,230,240 B2
(45) Date of Patent: Jan. 25, 2022

(54) CONNECTION DEVICE FOR CONNECTING A VEHICLE CRASH ABSORBING MEMBER TO A VEHICLE BODY COMPONENT

(71) Applicant: Volvo Car Corporation, Gothenburg (SE)

(72) Inventor: Johan Eklund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 35 days.

(21) Appl. No.: 16/925,372

(22) Filed: Jul. 10, 2020

(65) Prior Publication Data

US 2021/0061206 A1 Mar. 4, 2021

(30) Foreign Application Priority Data

Aug. 26, 2019 (EP) .................................. 19193538

(51) Int. Cl.
*B60J 7/00* (2006.01)
*B60R 19/34* (2006.01)
*B62D 21/15* (2006.01)
*B60R 19/24* (2006.01)

(52) U.S. Cl.
CPC ............ *B60R 19/34* (2013.01); *B62D 21/155* (2013.01); *B60R 2019/247* (2013.01)

(58) Field of Classification Search
CPC ......... B60R 19/34; B60R 19/18; B60R 19/24; B60R 19/00; B60R 21/045; B62D 21/152; B62D 21/155; B22F 2998/00; B22F 3/1125; B22F 7/006
See application file for complete search history.

(56) References Cited

U.S. PATENT DOCUMENTS

| 6,312,028 | B1 * | 11/2001 | Wilkosz | ................. | B60R 19/18 |
| | | | | | 188/377 |
| 6,893,063 | B2 * | 5/2005 | Harrison | ................ | B60D 1/485 |
| | | | | | 293/117 |
| 7,188,877 | B2 | 3/2007 | Gonzalez et al. | | |
| 7,926,868 | B2 * | 4/2011 | Braunbeck | .............. | B60R 19/34 |
| | | | | | 296/187.03 |

(Continued)

FOREIGN PATENT DOCUMENTS

DE 19603958 A1 8/1997

OTHER PUBLICATIONS

Jan. 22, 2020 European Search Report issued on International Application 19193538.

(Continued)

*Primary Examiner* — Kiran B Patel
(74) *Attorney, Agent, or Firm* — Clements Bernard Walker; Christopher L. Bernard

(57) ABSTRACT

The proposed connection device includes attachment portions that are separated from each other such that the one of the crash absorbing member and the vehicle body component is insertable between the attachment portions. This allows for a transverse slidable motion of the one of the crash absorbing member and the vehicle body component with respect to the main body. Thus, the crash absorbing member or the vehicle body component, whichever is going to be attached to the attachment portions, is slidable in transverse direction, i.e. substantially perpendicular to a longitudinal direction of e.g. the crash absorbing member.

20 Claims, 7 Drawing Sheets

(56) References Cited

U.S. PATENT DOCUMENTS

| | | | |
|---|---|---|---|
| 7,938,476 B2 | 5/2011 | Braunbeck et al. | |
| 8,020,907 B2 | 9/2011 | Wibbeke et al. | |
| 8,353,545 B1* | 1/2013 | Baldwin | B60R 19/34 |
| | | | 293/133 |
| 8,398,133 B2* | 3/2013 | Ghannam | B60R 19/34 |
| | | | 293/133 |
| 9,522,644 B2 | 12/2016 | Prasoody et al. | |
| 2005/0212312 A1* | 9/2005 | Sakuma | B60R 19/34 |
| | | | 293/133 |
| 2006/0043744 A1* | 3/2006 | Iketo | B60R 19/34 |
| | | | 293/132 |
| 2006/0066115 A1* | 3/2006 | Haneda | B60R 19/34 |
| | | | 293/133 |
| 2006/0186680 A1* | 8/2006 | Honda | B60R 19/18 |
| | | | 293/155 |
| 2009/0079210 A1* | 3/2009 | Matsumura | B60R 19/24 |
| | | | 293/155 |
| 2010/0194125 A1* | 8/2010 | Wibbeke | B60R 19/24 |
| | | | 293/120 |
| 2011/0049916 A1* | 3/2011 | Nakanishi | B60R 19/34 |
| | | | 293/133 |
| 2013/0076051 A1* | 3/2013 | Baldwin | B60R 19/34 |
| | | | 293/133 |
| 2013/0099514 A1* | 4/2013 | Kaneko | B60R 19/34 |
| | | | 293/133 |
| 2015/0001866 A1* | 1/2015 | Noyori | B60R 19/34 |
| | | | 293/133 |
| 2015/0054307 A1* | 2/2015 | Kito | B60R 19/12 |
| | | | 296/187.04 |
| 2015/0283901 A1* | 10/2015 | Bernardi | B60K 5/1275 |
| | | | 180/232 |
| 2016/0001725 A1* | 1/2016 | Nakanishi | B60R 19/34 |
| | | | 293/133 |
| 2016/0129866 A1* | 5/2016 | Kamiya | B60R 19/34 |
| | | | 293/133 |
| 2017/0088076 A1* | 3/2017 | Fujimoto | B60R 19/04 |
| 2018/0170294 A1 | 6/2018 | Hashimoto et al. | |
| 2018/0244225 A1* | 8/2018 | Nakayama | B60R 19/34 |
| 2018/0265135 A1* | 9/2018 | Komiya | B62D 21/06 |
| 2019/0016389 A1* | 1/2019 | Kamei | B62D 21/152 |
| 2020/0307478 A1* | 10/2020 | Eklund | B60K 11/08 |
| 2020/0324823 A1* | 10/2020 | Kawamura | B62D 21/08 |

OTHER PUBLICATIONS

Volvo Car Corporation, A connection device for connecting a vehicle crash absorbing member to a vehicle body component, EP19193538 Information on Search Strategy.

The Aluminium Automotive Manual, Applications—Car Body—Crash Management Systems, pp. 1-26.

* cited by examiner

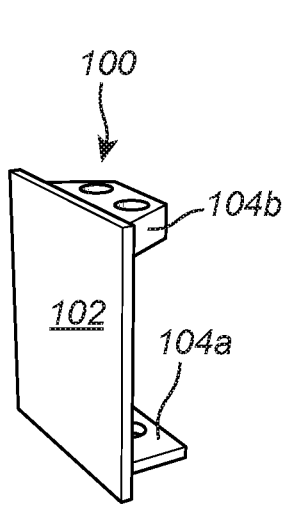
Fig. 1A
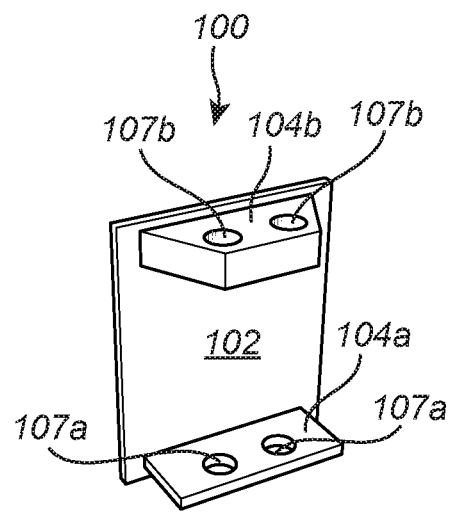
Fig. 1B
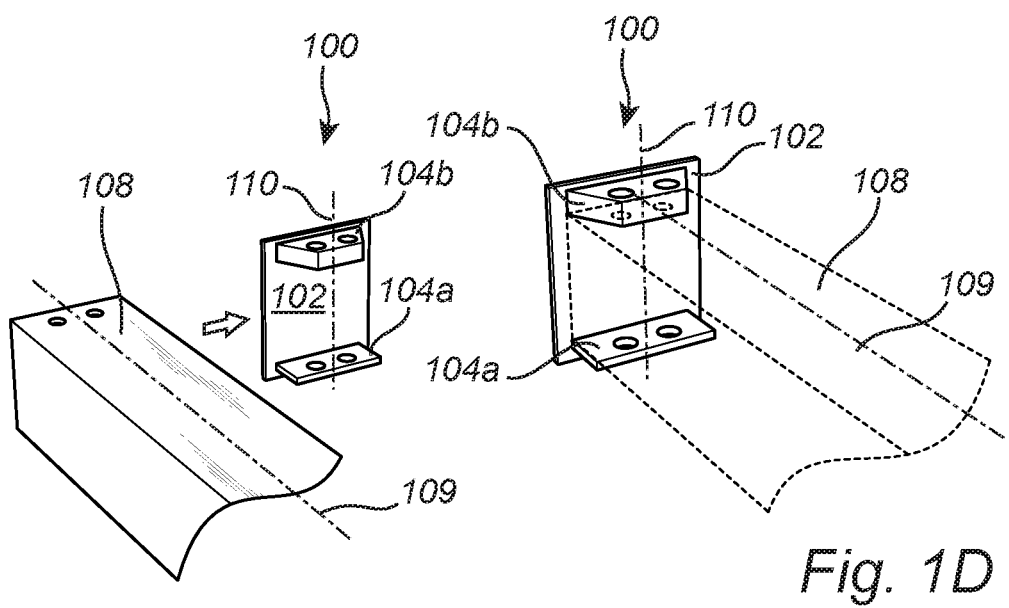
Fig. 1C
Fig. 1D

CONNECTION DEVICE FOR CONNECTING A VEHICLE CRASH ABSORBING MEMBER TO A VEHICLE BODY COMPONENT

CROSS-REFERENCE TO RELATED APPLICATION

The present disclosure claims the benefit of priority of co-pending European Patent Application No. 19193538.6, filed on Aug. 26, 2019, and entitled "A CONNECTION DEVICE FOR CONNECTING A VEHICLE CRASH ABSORBING MEMBER TO A VEHICLE BODY COMPONENT," the contents of which are incorporated in full by reference herein.

TECHNICAL FIELD

The present disclosure relates to a connection device for connecting a vehicle crash absorbing member to a vehicle body component.

BACKGROUND

Vehicle chassis and subframes are intended to serve as mechanical support for various structural elements of the vehicle. There is often a trade-off between a preferred design choice of components and a tooling access space reservation. In other words, the configuration and location of various structural elements must be such that service personnel may be able to access them without too much burden, for example for replacement and/or maintenance.

Therefore, the design of the vehicle structure and the location of the structural elements are subject to assembly tolerances that may pose limitations to the design. In addition, cramped space in the vehicle structure often leads to cumbersome procedures for attachment and detachment of vehicle structural elements from the vehicle chassis or subframe, and sometimes to removal of additional structural elements only to be able to access the intended structural elements.

For example, most modern vehicles have so-called crash boxes intended to be deformed in an impact. The crash boxes are mounted to for example a vehicle sub-frame. In order to remove the subframe from the vehicle, the crash boxes must be detached from the sub-frame which requires removal of screws in a cramped space, and sometimes removal of other parts such as the bumper of the vehicle.

SUMMARY

The present disclosure generally relates to a connection device for connecting a vehicle crash absorbing member to a vehicle body component.

The proposed connection device allows for an increased available space in the surroundings of the interface between the crash absorbing member and the vehicle body component since the tooling access space is shifted away from a previous difficult access point. Furthermore, the connection device according to some embodiments aids in maintaining at least one of the crash absorbing member and the vehicle body component in place while it is being attached, i.e. serving as a third hand for the staff.

The above advantages are provided by the proposed connection device which includes attachment portions that are separated from each other such that one of the crash absorbing member and the vehicle body component is insertable between the attachment portions. The attachment portions are configured to allow for a transverse slidable motion of the one of the crash absorbing member and the vehicle body component with respect to a main body of the connection device. Thus, the crash absorbing member or the vehicle body component, whichever is going to be attached to the attachment portions, is slidable in transverse direction along the main body, i.e. substantially perpendicular to a longitudinal direction of e.g. the crash absorbing member, when mounting or removing the crash absorbing member or the vehicle body component from the connection device.

By enabling a transverse motion of the connection device during attachment of the crash absorbing member to the vehicle body component or vice versa, provides several advantages. For example, mounting tolerances in the longitudinal direction of a vehicle front part are relatively strict and if a longitudinal motion is required, e.g. for inserting a mounting bracket into a crash box, a mounting clearance in the longitudinal direction is required. This may lead to that several other parts must be removed if for example the vehicle subframe is to be replaced or removed. This is alleviated by instead being able to mount the crash absorbing member to the vehicle body component or vice versa by a transverse motion.

Furthermore, the proposed connection device provides for attaching the crash absorbing member to the vehicle body component or vice versa by means of elongated attachment members inserted in a direction perpendicular to the longitudinal direction. Prior art system often require insertion of mounting screws in the disadvantageous longitudinal direction. Thereby, with the proposed connection device the generally cramped space in the longitudinal direction is avoided and maintenance and assembly are facilitated.

Accordingly, the inventors propose a connection device for connecting a vehicle crash absorbing member to a vehicle body component, the connection device comprises: a main body adapted to abut against the crash absorbing member and the vehicle body component, the main body is attachable to one of the crash absorbing member and the vehicle body component via a first set of attachment portions, wherein the attachment portions are separated from each other such that the one of the crash absorbing member and the vehicle body component is insertable between the attachment portions, thereby allowing for a transverse slidable motion of the one of the crash absorbing member and the vehicle body component with respect to the main body.

Further features of, and advantages with, the embodiments of the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF DRAWINGS

These and other aspects of the present disclosure will now be described in more detail, with reference to the appended drawings showing example embodiments of the invention, wherein:

FIGS. 1A and 1B are perspective views of a connection device according to embodiments of the present disclosure;

FIGS. 1C and 1D conceptually illustrate sliding one of a crash absorbing member and a vehicle body component in between the attachment portions in a transverse direction;

DESCRIPTION OF EMBODIMENTS

Figure 2:
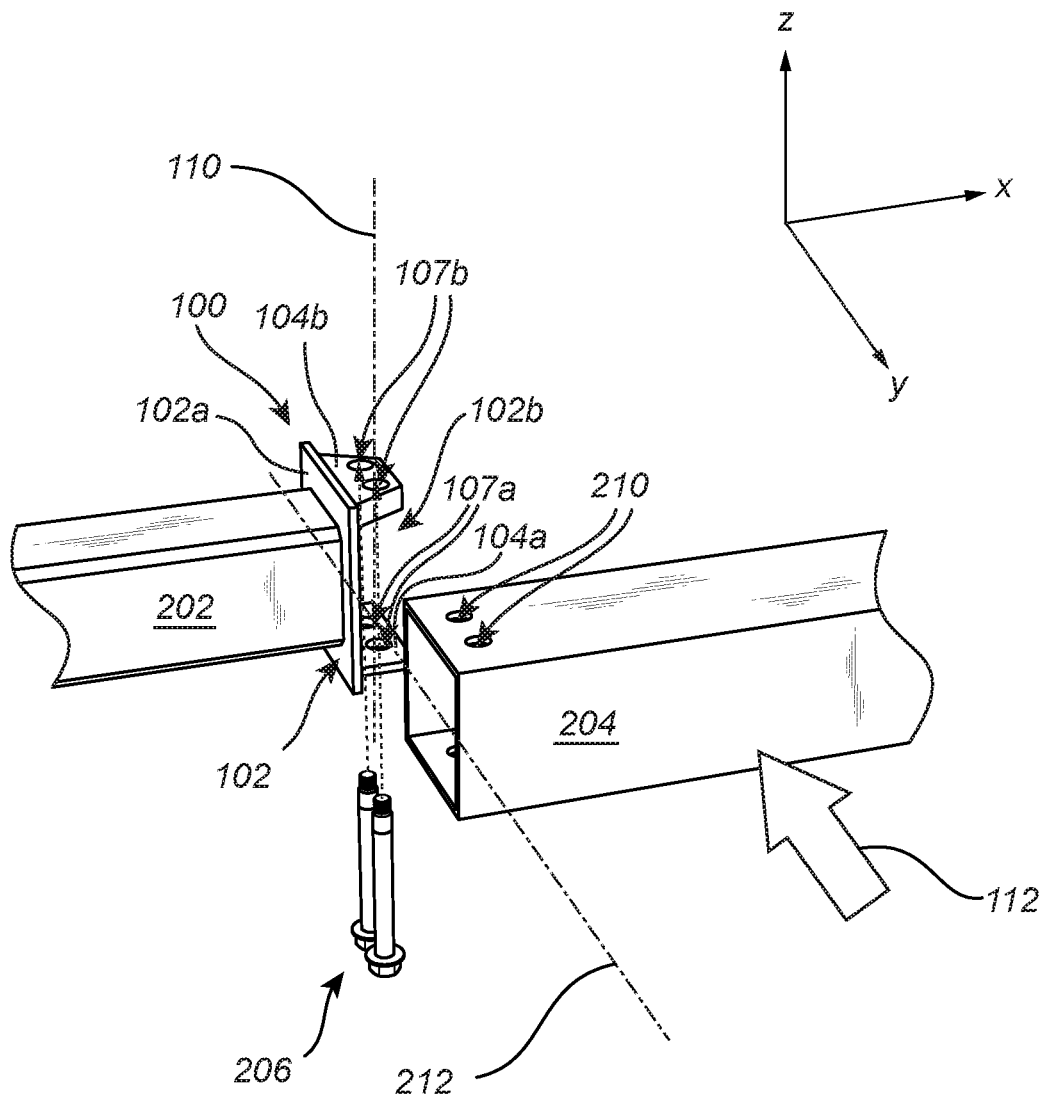
FIG. 2 illustrates a vehicle body component being slid in place in a connection device attached to a crash absorbing member according to embodiments of the present disclosure.

In the present detailed description, various embodiments of a connection device according to the present invention are described. However, embodiments of the present disclosure may be realized in many different forms and should not be construed as limited to the embodiments set forth herein; rather, these embodiments are provided for thoroughness and completeness, and to fully convey the scope of the invention to the skilled person. Like reference characters refer to like elements throughout.

FIGS. 1A-B illustrates perspective views of an example connection device 100 for connecting a vehicle crash absorbing member to a vehicle body component according to embodiments of the present disclosure. The connection device 100 comprises a main body 102 adapted to abut against the crash absorbing member and the vehicle body component. The main body 102 is attachable to one of the crash absorbing member and the vehicle body component via a first set of attachment portions 104a-b. As illustrated in FIGS. 1C-D, the attachment portions 104a-b are separated from each other such that the one 108 of the crash absorbing member and the vehicle body component is insertable between the attachment portions 104a-b, thereby allowing for a transverse slidable motion of the one 108 of the crash absorbing member and the vehicle body component with respect to the main body 102. The one 108 of the crash absorbing member and the vehicle body component is arranged between the attachment portions 104a-b in FIG. 1D.

Preferably, the attachment portions 104a-b are adapted to provide a tight fit on the one 108 of the crash absorbing member and the vehicle body component. Thus, the distance between the attachment portions 104a-b is substantially the same, or somewhat larger than the corresponding dimension of the one of the crash absorbing member and the vehicle body component that is to be inserted between the attachment portions 104a-b.

The attachment portion 104a includes through-holes 107a, and attachment portion 104b includes assembly holes 107b, as will be described in more detail with reference to subsequent drawings.

The sliding motion is possible before the attachment portions 104a-b are attached to the one 108 of the crash absorbing member and the vehicle body component. In order words, the one 108 of the crash absorbing member and the vehicle body component may advantageously be transversely slid into place between the attachment portions 104a-b, as shown in FIG. 1C-D. Similarly, the one 108 of the crash absorbing member and the vehicle body component may be transversely slid off the connection device 100 for disassembly purposes.

The part denoted 108 may thus be either a crash absorbing member or a vehicle body component depending on which is to be attached to the connection device 100 via the attachment portions 104a-b.

The main body 102 provides the interface between the crash absorbing member and the vehicle body component. A transverse slidable motion is in the plane of the interface between the crash absorbing member and the vehicle body component, along the main body 102. In contrast, an axis 109 in the longitudinal direction intercepts the crash absorbing member and the vehicle body component, and is perpendicular to the main body 102. Accordingly, the slidable motion is in a direction perpendicular to the longitudinal axis 109 of the one of the crash absorbing member and the vehicle body component. Further, the slidable motion is in a direction substantially perpendicular to an axis 110 between the attachment portions 104a-b. The axis 110 is in the same plane as the transverse slidable motion. The main body 102 may be substantially plate-shaped. Further, the connection device 100 may be generally U-shaped, formed by the main body 102 and the attachment portions 104a-b.

The inventors realized that attachment and detachment of a crash absorbing member and a vehicle body component to/from each other is facilitated by enabling a sliding transverse motion of the of connection device, instead of the often in prior art required longitudinal motion. This is due to tolerance requirements in the longitudinal direction of the vehicle. Further, the inventors realized that by separating the attachment portions from each other such that the one of the crash absorbing member and the vehicle body component is insertable between the attachment portions enables for the one of the crash absorbing member and the vehicle body component to rest on the lower of the attachment portions during assembly, thereby facilitating assembly and disassembly further.

In embodiments, the main body may be directly attachable to one of the crash absorbing member and the vehicle body component and attachable via the attachment portions to the other one of the crash absorbing member and the vehicle body component. For example, and as will be described with reference to subsequent drawings, the main body may be directly attachable to one of the crash absorbing member and the vehicle body component by means of welding.

Turning now to FIG. 2 which conceptually illustrates the connection device 100 directly attached to a crash absorbing member 202 at the main body 102. The main body 102 may be welded to the crash absorbing member 202 on one side 102a of the main body 102. On the other side 102b, opposite from the side 102a are the attachment members 104a-b located. The attachment portions 104a-b are separated from each other such that the vehicle body component 204 is insertable between the attachment portions 104a-b. In this way, the vehicle body component 204 may slide in a transverse direction 112 with respect to the main body 102, and the crash absorbing member 202.

The main body 102 is attachable to the vehicle body component 204 by elongated attachment members 206 arrangeable in through-holes 107a of at least one of the attachment portions 104a-b and through-holes 210 in the vehicle body component 204, wherein when mounted, the elongated attachment members 206 extend between the attachment portions 104a-b across the main body 102.

For attachment of the vehicle body component 204 to the crash absorbing member 202 via the connection device 100 which is firmly attached to the crash absorbing member 202, the vehicle body component 204 may be transversely slid at least partly along axis 212 in place between the upper attachment member 104b and the lower attachment member 104a. Here, the vehicle body component 204 may rest on the lower attachment member 104a while the staff inserts the screws 206 into the through-holes 107a of the lower attachment portion 104a. The screws 206 are further inserted through the vehicle body component 204 until they reach the through holes 210 and finally may be fixated in the assembly holes 107b of the upper attachment portion 104b.

Advantageously, in the embodiment of FIG. 2, the elongated attachment members 206 are insertable in the through-holes 107a of the attachment portion 104a in a direction parallel with the axis 110 which intercepts both of two holes 107a-b intended for one elongated attachment member 206. As described above, the axis 110 (along z-axis) is perpendicular to an axis 212 which is parallel with the direction 112 (along the y-axis) of the slidable motion of the vehicle body component 204. This configuration of the attachment members 104a-b and the through-holes 107a provides for easier access to the elongated attachment members 206 from below the crash absorbing members, e.g. crash boxes, and the e.g. subframe of the vehicle, compared to screws inserted in the longitudinal direction, along the x-axis. In this way, the screws 206 may be inserted vertically from below the vehicle.

The elongated attachment members 206 may be screws, and for facilitated assembly, e.g. avoiding nuts, the assembly holes 107b are threaded for screw fixation. The holes 107b in the attachment portion 104b may not be through-holes, but only assembly holes for screw fixation.

Figure 3:
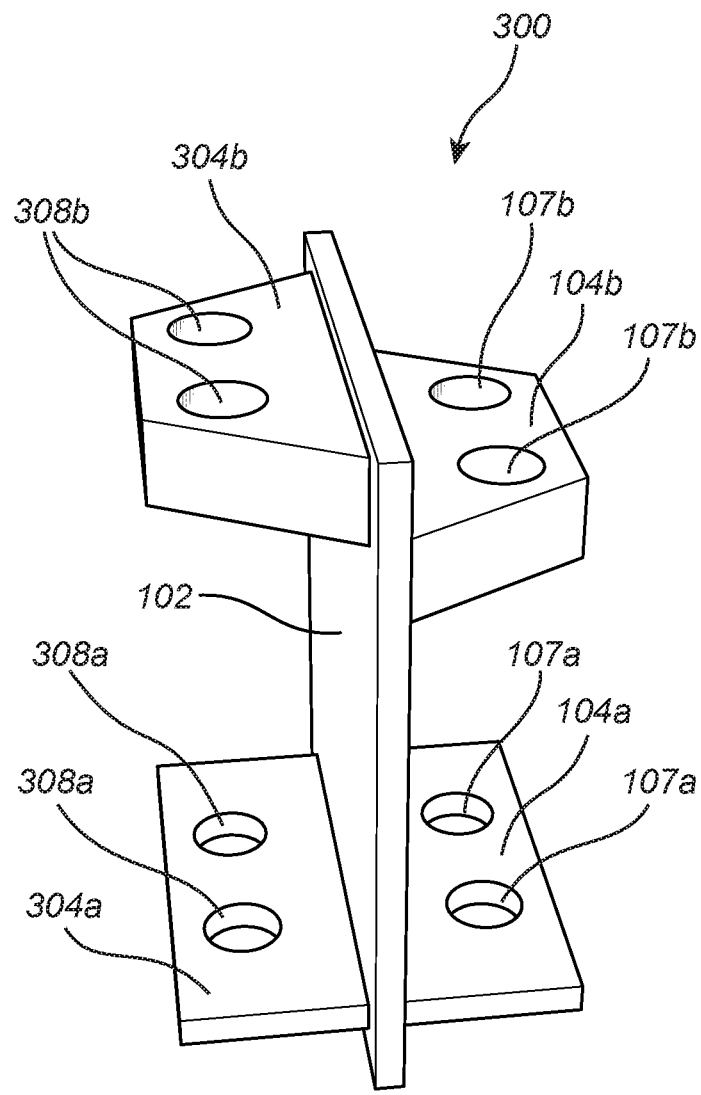
FIG. 3 is a perspective view of a connection device according to embodiments of the present disclosure.

FIG. 3 illustrates an example connection device 300 according to embodiments of the present disclosure. The connection device 300 includes the main body 102 and the first set of attachment portions 104a-b. The connection device 300 further has a second set of attachment portions 304a-b. Thus, the first set of attachment portions 104a-b are configured for attaching the main body 102 to one of the crash absorbing member and the vehicle body component, and the main body 102 is attachable to the other one of the crash absorbing member and the vehicle body component by the second set of attachment portions 304a-b.

As with the first set of attachment portions 104a-b, the attachment portions 304a-b of the second set may be separated from each other such that respective one of the crash absorbing member and the vehicle body component is insertable between the second set of attachment portions 304a-b, thereby allowing for a slidable motion of the respective one of the crash absorbing member and the vehicle body component with respect to the main body 102. Thus, the connection device 300 having two sets of attachment portions 104a-b, 304a-b, located on opposite sides of the main body 102 enables various options for attaching and detaching the crash absorbing member and the vehicle body component to/from each other. The attachment portions 104a-b, 304a-b allows for releasable attachment of the connection device 300 to the crash absorbing member and the vehicle body component which means that the connection device 300 may be attached to the crash absorbing member and the vehicle body component in any order. Furthermore, in cases where the space in the longitudinal direction is cramped, the connection device 300 may be slid off both the crash absorbing member and the vehicle body component whereby the crash absorbing member or the vehicle body component may be removed from the vehicle in a transverse direction, i.e. downwards from below the vehicle.

The attachment portion 304a includes through-holes 308a for the insertion of elongated attachment members, and the attachment portion 304b includes assembly holes 308b for the fixation of the of elongated attachment members.

Figure 4:
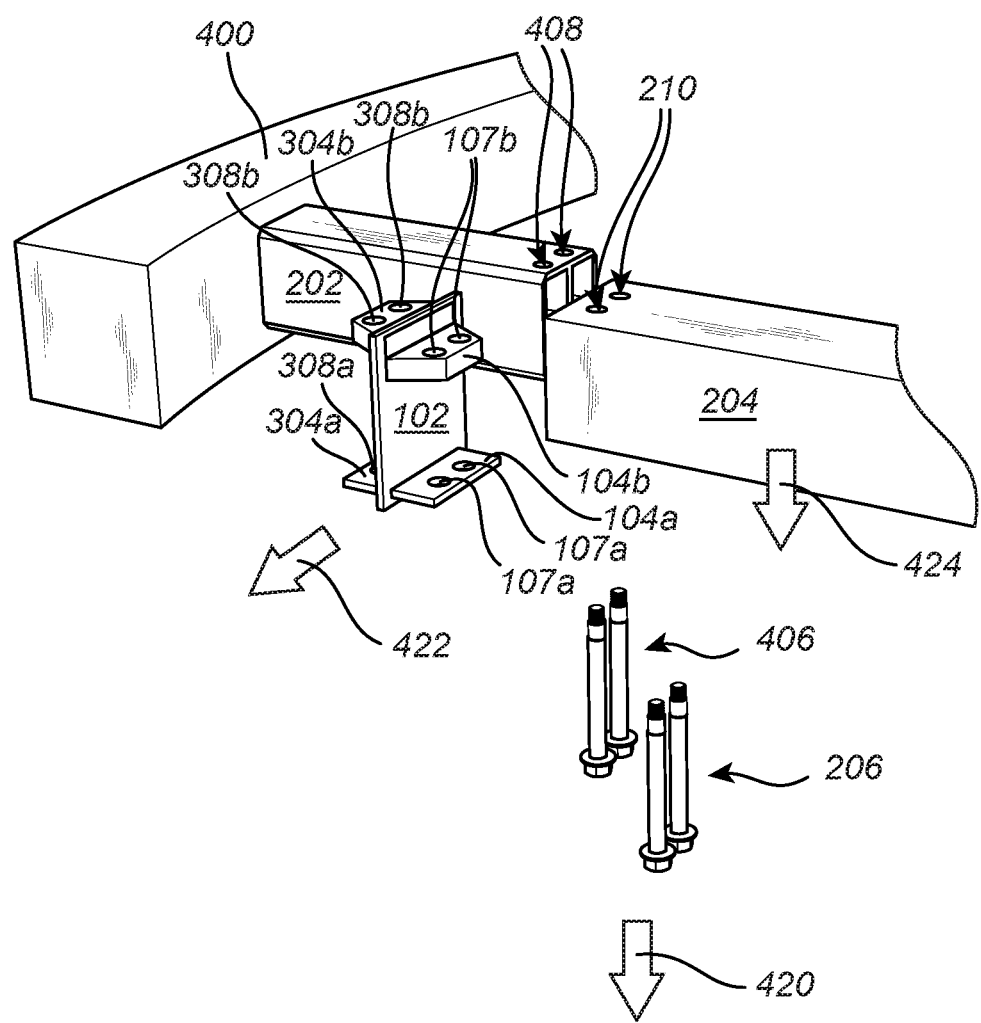
FIG. 4 conceptually illustrates use of a connection device according to embodiments of the present disclosure.

FIG. 4 conceptually illustrates use of the connection device 300. In FIG. 4, the connection device 300 is illustrated as it is removed from the crash absorbing member 202 and the vehicle body component 204.

The main body 102 is attachable to the crash absorbing member 202 and the vehicle body component 204 by elongated attachment members 206 and 406 arrangeable in through-holes 107a and 308a of the respective attachment portion 104a, 304a.

Specifically, in FIG. 4, the main body 102 of the connection device 300 was attached to the crash absorbing member 202 by elongated attachment members 406 arranged through through-holes 308a of the lower attachment portion 304a. The elongated attachment members 406, e.g. screws, where tightened in threaded holes 308b of the upper attachment portion 304b. Thus, the elongated attachment members 406 were arranged through the through-holes 308a of the lower attachment portion 304a, through holes (not shown) of the crash absorbing member 202, possibly through bushings inside the crash absorbing member 202, then through upper through-holes 408 of the crash absorbing member 202, and finally tightened in the upper attachment portion 304b. Similarly, the elongated attachment members 206 were arranged through the through-holes 107a of the lower attachment portion 104a, through holes (not shown) of the vehicle body component 204, possibly through bushings inside the vehicle body component 204, then through upper through-holes 210 of the vehicle body component 204, and finally tightened in the upper attachment portion 104b.

Once the second set of attachment portions 304a-b are attached to the crash absorbing member 202, the lower attachment portion 104a may serve as a support for the vehicle body component 204 when it is being attached to the first set of attachment portions 104a-b. Thus, the vehicle body component 204 may be slid into place in the gap between the attachment portions 104a-b where it may rest on the lower attachment portion 104a.

For detachment of the vehicle body component 204 from the crash absorbing member 202, the elongated attachment members 206 and 406 may first be untightened and removed as indicated by the arrow 420. Once the elongated attachment members 206 and 406 are removed, the connection device 300 may be transversely slid in the transverse direction as indicated by the arrow 422. Subsequently, the vehicle body component 204 may be removed by lowering it a downward direction 424. Accordingly, the screws 406 and 206 may be removed by easily accessible screws that may be reached from below the vehicle. Subsequently, the vehicle body component may be moved directly downwards without the need for any longitudinal motion or removal of screws in the longitudinal direction.

In embodiments, the attachment portions are flanges extending from the main body. In some embodiments is the flange, including the through-holes in which the elongated attachment members are firstly inserted for attachment, a deformable flange. The deformation of the flange refers to that when tightening the elongated attachment member, the flange is deformed by the applied pressure to provide a tight fit around the crash absorbing member and/or the vehicle body component that it is attached to. This relieves the assembly tolerance requirements. The deformable attachment portions may be the attachment portions 304a and 104a, and may have a thickness smaller than the thickness of the attachment portions 304b and 104b, respectively.

Figure 5:
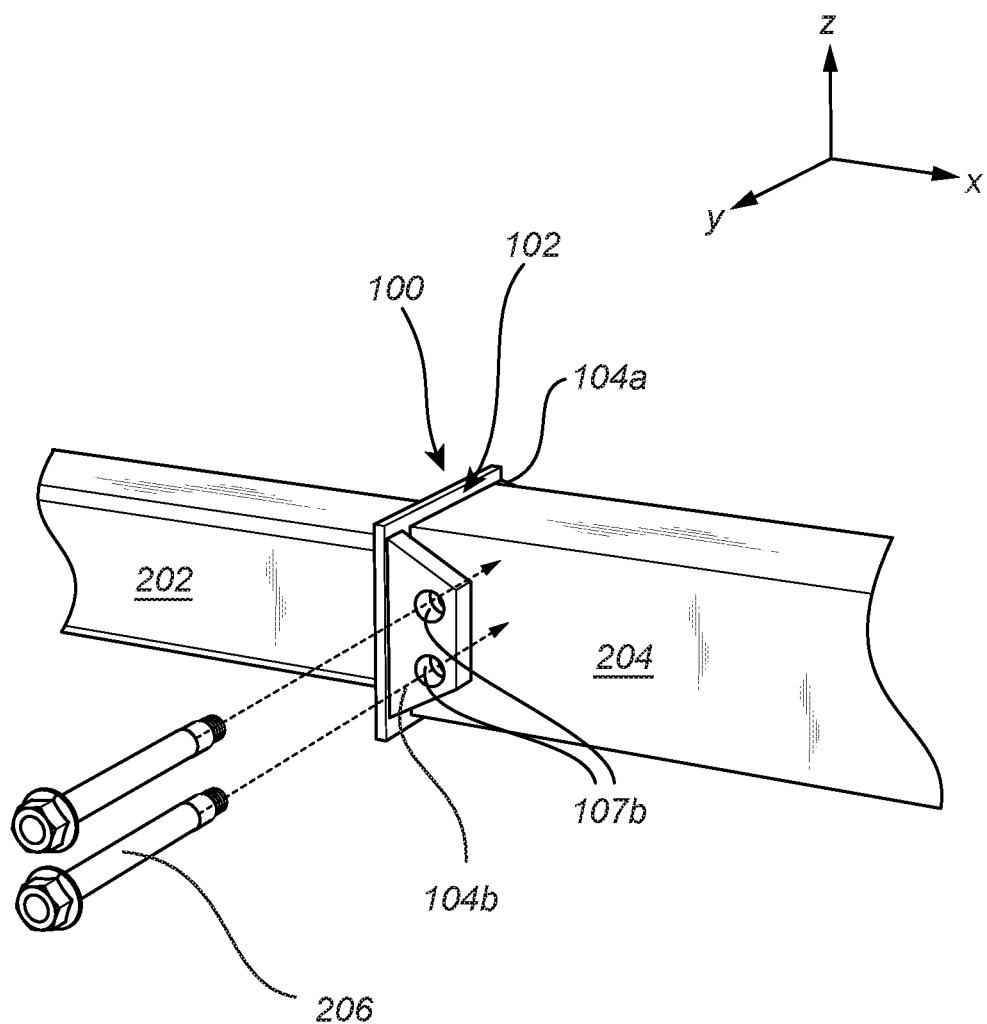
FIG. 5 conceptually illustrates use of a connection device according to embodiments of the present disclosure.

In some embodiments, the attachment portions are located such that the crash absorbing member and/or the vehicle body component may be slid into between the attachment portions in a transverse direction being substantially vertical. This is obtained by rotating the connection device 90 degrees with respect to the arrangement shown in FIG. 2. In such embodiments, the elongated attachment members are inserted in the transverse direction, here along the y-axis, i.e. along a direction parallel with the axis 212 in FIG. 2. FIG. 5 conceptually illustrates such a configuration. Here, the connection device 100 includes the main body 102 being attached to the vehicle body component 204 via attachment portions 104a-b, and elongated attachment members 206. The main body component may in this example embodiment be directly attached to the crash absorbing member 202. The transverse sliding motion of the vehicle body component is here in the downward direction, along the z-axis, since the gap between the attachment portions 104a-b is in the side-to-side direction of the vehicle.

Figure 6:
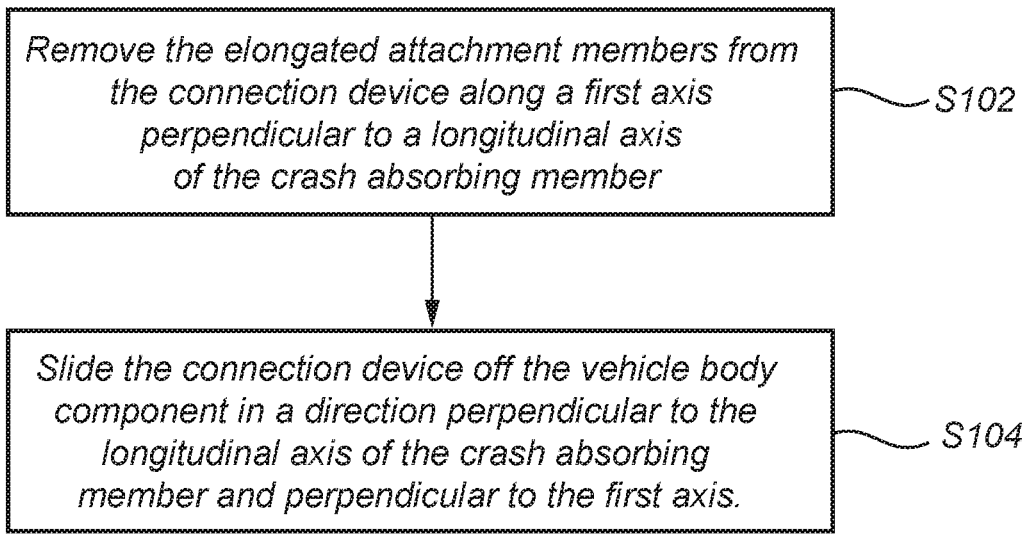
FIG. 6 is a flow-chart of method steps according to embodiments of the present disclosure.

FIG. 6 is a flow-chart of method steps according to embodiments of the present disclosure. The method is for detaching a vehicle body component from a crash box attached to each other by means of a connection device and elongated attachment members arranged in through holes of attachment portions of the connection device and the subframe. In step S102, removing the elongated attachment members from the connection device along a first axis perpendicular to a longitudinal axis of the crash box. In step S104, sliding the connection device off the vehicle body component in a direction perpendicular to the longitudinal axis of the crash box and perpendicular to the first axis. Subsequently may the vehicle body component be removed from the crash box.

Figure 7:
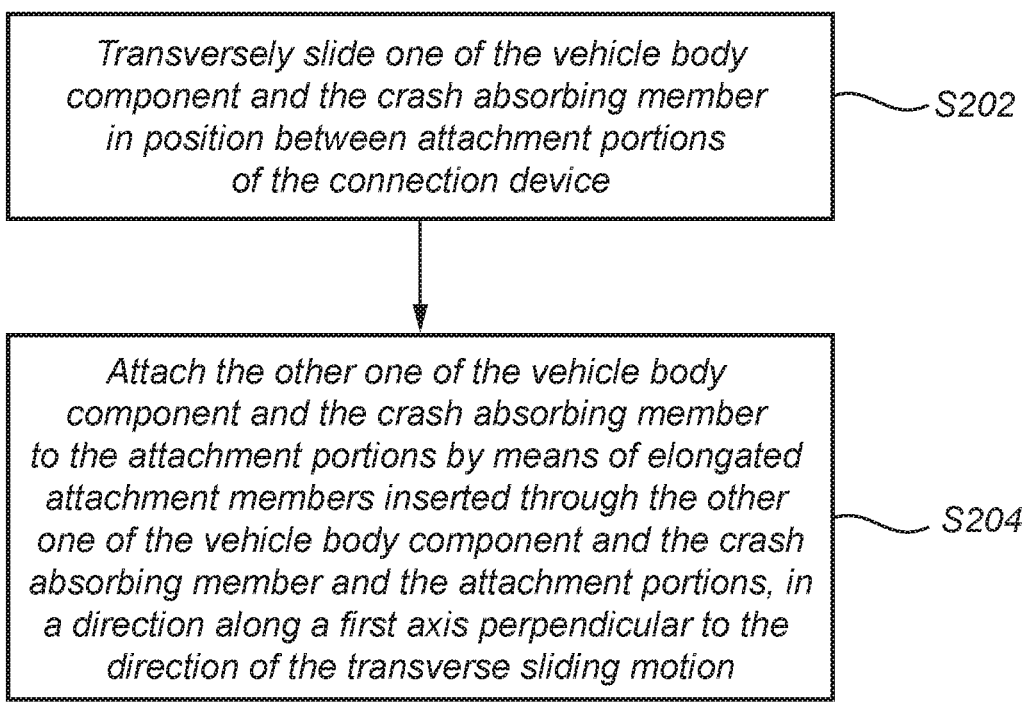
FIG. 7 is another flow-chart of method steps according to embodiments of the present disclosure.

FIG. 7 is a flow-chart of method steps according to embodiments of the present disclosure. The method is for attaching a vehicle body component and a crash absorbing member to each other by means of a connection device and elongated attachment members. The connection device being provided attached to one of the vehicle body component and the crash absorbing member. In step S202, transversely sliding the other one of the vehicle body component and the crash absorbing member in position between attachment portions of the connection device. In step S204 attaching the other one of the vehicle body component and the crash absorbing member to the attachment portions by means of elongated attachment members inserted through the other one of the vehicle body component and the crash absorbing member and the attachment portions in a direction perpendicular to the direction of the transverse sliding motion.

Figure 8:
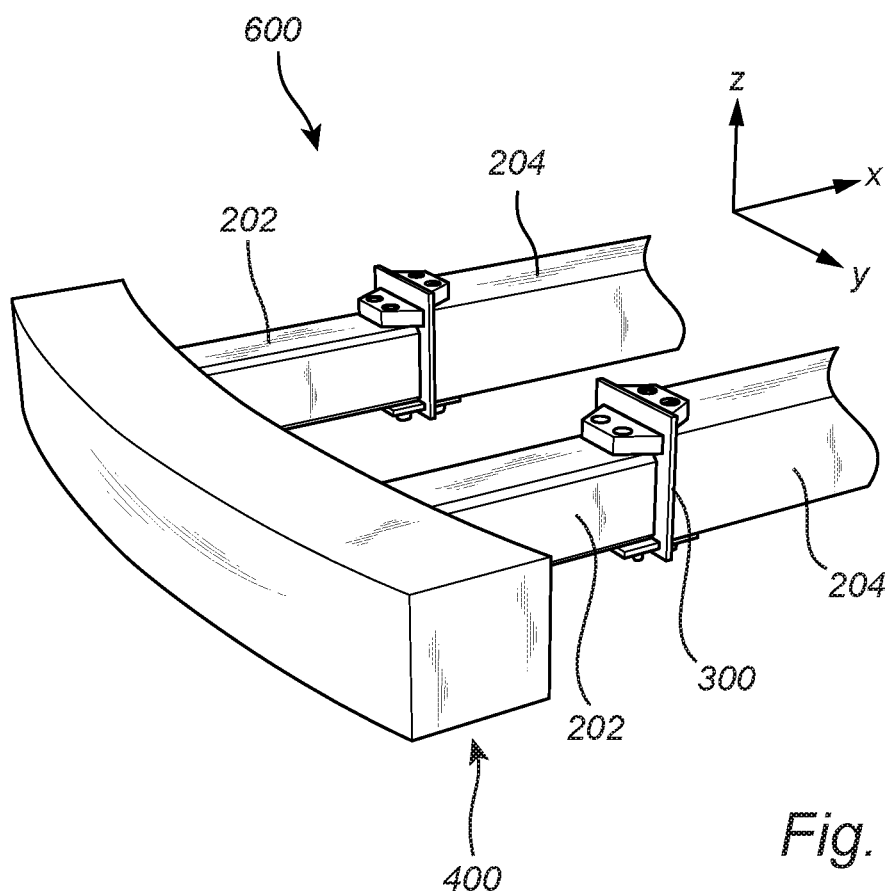
FIG. 8 conceptually illustrates a vehicle front structure according to embodiments of the present disclosure.

As shown in FIG. 8, there is further provided a vehicle front structure 600 comprising: at least one crash absorbing member 202, and a vehicle body component 204 such as a sub-frame. The at least one crash absorbing member 202 is attached to the respective vehicle body component 204 by a connection device 300 according to the present disclosure. The crash absorbing member is here attached to the front bumper 400.

With respect to a vehicle standing on the ground, the transverse slidable motion may be either in the side-to-side, i.e. left-to-right direction of the vehicle along the y-axis, or in a vertical direction, i.e. upwards or downwards along the z-axis, depending on the specific arrangement of the connection device. However, the transverse sliding motion is not in the longitudinal direction, along the x-axis.

There is also provided a vehicle comprising the vehicle front structure.

The connection device may preferably be made in one piece. Alternatively, the main body is made in one piece and the attachment members are attached to the main body by e.g. welding.

The connection device described herein may be manufactured by e.g. extrusions and may be made from an aluminium alloy or other high strength materials.

A crash absorbing member may be a so-called crash box arranged to absorb energy in vehicle impact. A crash box is often arranged directly behind, or at least close to, the front bumper or front transverse beam of a vehicle. Crash boxes are considered known per se.

By means of the herein disclosed connection device, the crash absorbing member may be attachable to a vehicle body component which may be provided in various forms depending of specific vehicle structural designs. For example, the vehicle body component may be a subframe, a side rail, or any other vehicle upper or lower vehicle load paths for crash energy absorption, either in the front and or rear of the vehicle.

The person skilled in the art realizes that the present invention by no means is limited to the preferred embodiments described above. On the contrary, many modifications and variations are possible within the scope of the appended claims.

The vehicle may be of various types, such as a light-duty vehicle e.g. a car, although trucks may also be applicable.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. A connection device for connecting a vehicle crash absorbing member to a vehicle body component, the connection device comprising:
   a main body adapted to abut against the crash absorbing member and the vehicle body component, the main body is attachable to one of the crash absorbing member and the vehicle body component via a first set of attachment portions,
   wherein the attachment portions are separated from each other such that the one of the crash absorbing member and the vehicle body component is insertable between the attachment portions, thereby allowing for a transverse slidable motion of the one of the crash absorbing member and the vehicle body component with respect to the main body.

2. The connection device according to claim 1, wherein a first and a second attachment portions are facing each other such that a gap is formed therebetween, wherein the one of the crash absorbing member and the vehicle body component is arrangeable in the gap.

3. The connection device according to claim 2, wherein the transverse slidable motion is in a direction substantially perpendicular to an axis between the attachment portions.

4. The connection device according to claim 1, wherein the slidable motion is in a direction perpendicular to a longitudinal axis of the one of the crash absorbing member and the vehicle body component.

5. The connection device according to claim 1, wherein the main body is attachable to the one of the crash absorbing member and the vehicle body component by elongated attachment members arrangeable in through-holes of at least one of the attachment portions and through-holes in the one of the crash absorbing member and the vehicle body component, wherein when mounted, the elongated attachment members extend between attachment portions across the main body.

6. The connection device according to claim 5, wherein the elongated attachment members are insertable in the through-holes in a direction perpendicular to an axis parallel with the direction of the transverse slidable motion.

7. The connection device according to claim 1, wherein the main body is directly attachable to one of the crash absorbing member and the vehicle body component and attachable via the attachment portions to the other one of the crash absorbing member and the vehicle body component.

8. The connection device according to claim 7, wherein the main body is directly attachable to one of the crash absorbing member and the vehicle body component by means of welding.

9. The connection device according to claim 8, wherein the main body is directly attachable only to the crash absorbing member by means of welding.

10. The connection device according to claim 1, wherein the first set of attachment portion are configured for attaching the main body to one of the crash absorbing member and the vehicle body component, the main body is attachable to the other one of the crash absorbing member and the vehicle body component by a second set of attachment portions.

11. The connection device according to claim 10, wherein the attachment portions of the second set are separated from each other such that respective one of the crash absorbing member and the vehicle body component is insertable between the second set of attachment portions, thereby allowing for a transverse slidable motion of the respective one of the crash absorbing member and the vehicle body component with respect to the main body.

12. The connection device according to claim 11, wherein the main body is attachable to the receptive one of the crash absorbing member and the vehicle body component by elongated attachment members arrangeable in through-holes of at least one of the second set of attachment portions and the respective one of the crash absorbing member and the vehicle body component.

13. The connection device according to claim 11, wherein the first set of attachment portions are located on one side of the main body, and the second set of attachment portions are located on the opposite side of the main body.

14. The connection device according to claim 1, wherein the main body is substantially plate-shaped.

15. The connection device according to claim 1, wherein the attachment portions are flanges extending from the main body.

16. A vehicle front structure, comprising:
at least one crash absorbing member; and
a vehicle body component, wherein the at least one crash absorbing member is attached to the vehicle body component by a connection device according to claim 1.

17. The vehicle front structure according to claim 16, wherein the crash absorbing member is a crash box.

18. A vehicle comprising the vehicle front structure according to claim 16.

19. A method for detaching a vehicle body component from a crash absorbing member attached to each other by means of a connection device and elongated attachment members arranged in through holes of attachment portions of the connection device and the vehicle body component, the method comprising:
removing the elongated attachment members from the connection device along a first axis perpendicular to a longitudinal axis of the crash absorbing member; and
sliding the connection device off the vehicle body component in a direction perpendicular to the longitudinal axis of the crash absorbing member and perpendicular to the first axis.

20. A method for attaching a vehicle body component and a crash absorbing member to each other by means of a connection device and elongated attachment members, the connection device being attached to one of the vehicle body component and the crash absorbing member, the method comprising:
transversely sliding the other one of the vehicle body component and the crash absorbing member in position between attachment portions of the connection device, and
attaching the other one of the vehicle body component and the crash absorbing member to the attachment portions by means of elongated attachment members inserted through the other one of the vehicle body component and the crash absorbing member and the attachment portions in a direction along a first axis perpendicular to the direction of the transverse sliding motion.

* * * * *